United States Patent [19]

Mears et al.

[11] 3,938,155

[45] Feb. 10, 1976

[54] HIGH STABILITY MODULATOR FOR INSTRUMENT LANDING SYSTEMS

[75] Inventors: William E. Mears, Leawood, Kans.; Clifford E. Mueller, Wellington; David M. Staehling, Raytown, both of Mo.

[73] Assignee: Wilcox Electric, Inc., Kansas City, Mo.

[22] Filed: July 15, 1974

[21] Appl. No.: 488,582

[52] U.S. Cl. .............. 343/107; 343/108 R; 332/44; 325/138
[51] Int. Cl.² .......................................... G01S 1/08
[58] Field of Search .......... 343/107, 108 R; 332/44; 325/138

[56] References Cited
UNITED STATES PATENTS

| | | | |
|---|---|---|---|
| 2,434,955 | 1/1948 | Pickles | 343/107 |
| 3,007,162 | 10/1961 | Kruesi | 343/107 |
| 3,026,489 | 3/1962 | Gold | 332/44 |
| 3,434,144 | 3/1969 | Cooper | 343/108 R |

*Primary Examiner*—T. H. Tubbesing
*Assistant Examiner*—T. M. Blum
*Attorney, Agent, or Firm*—D. A. N. Chase

[57] ABSTRACT

In an instrument landing system for aircraft, the transmitter is required to produce an amplitude modulated signal comprising a carrier wave having sidebands containing the sum of a 90 Hz and a 150 Hz signal as modulation, and to also produce a double sideband, suppressed carrier signal in which the modulation is the difference between the 90 Hz and 150 Hz signals. In the present invention, the 90 Hz and 150 Hz signals are summed to provide a composite modulating signal that is employed to directly modulate the radio frequency carrier. To provide the double sideband signal the carrier is fed to a 180° phase shift network, and the carrier and the network output are alternately delivered to a modulated amplifier stage by an RF switch which is operated with each change in the sign of a difference signal derived from the 90 Hz and 150 Hz signals. Accordingly, the output from the RF switch is a phasechanging carrier that undergoes a phase reversal with each change in the polarity of the difference signal. This phase-changing carrier is modulated with a modulating signal that is the absolute value of the difference signal, and the resultant is the desired double sideband, suppressed carrier output. A high gain operational amplifier in conjunction with an envelope detector in a negative feedback loop is employed with both the AM and the DSB modulators to insure high stability.

6 Claims, 3 Drawing Figures

HIGH STABILITY MODULATOR FOR INSTRUMENT LANDING SYSTEMS

This invention relates to improvements in modulators for instrument landing systems and, in particular, to an improved method and apparatus for providing the required amplitude modulated and double sideband signals in transmitting equipment used in such systems.

An instrument landing system (ILS) for aircraft provides guidance both in the azimuth plane for alignment with the runway and along the glide path of the approaching aircraft. Guidance in the azimuth plane is accomplished by the localizer portion of the system which defines a line of approach corresponding to the center line of the runway. Space modulated radio navigation signals are received and demodulated by the airborne receiver and, if the aircraft is on the line of approach, the difference in the depth of modulation (ddm) of detected 90 Hz and 150 Hz signals is zero. Likewise, in the glide slope portion of the system, the ddm is also zero if the aircraft is in the defined glide path.

Special modulators are employed in the transmitters of an instrument landing system in order to produce the required radio frequency signals which are fed to the antenna arrays of the localizer and glide slope equipment. When radiated, the signals combine in space to provide the 90 Hz and 150 Hz space modulated navigation signals whose difference in depth of modulation provides guidance to a landing aircraft. Two RF output signals are required from the localizer and glide slope transmitters, a carrier wave having sidebands containing the sum of a 90 Hz and a 150 Hz signal as modulation, and a double sideband, suppressed carrier signal in which the modulation is the difference between the 90 Hz and 150 Hz signals. Since the quality of the guidance information radiated into space is directly related to the quality of such information produced by the transmitting equipment, the modulators are one of the most critical components of the instrument landing system.

A prior modulation approach employed to form these required signals involves separately modulating two isolated sources of the same carrier with the 90 Hz and 150 Hz signals to create two signals that are then added and subtracted by means of hybrid combiners to produce the carrier plus sidebands and the sidebands only output signals. Developing the RF modulated wave form with precision is difficult and the addition and subtraction process leads to instabilities and drift problems. Furthermore, it has also been a prior practice to employ motor driven, mechanical sideband generators for producing the 90 Hz and 150 Hz modulation information, thereby adding the inherent problems associated with mechanical equipment including inherent bulk, wear and maintenance considerations.

It is, therefore, an important object of the present invention to provide a modulating method and modulator apparatus for overcoming the problems discussed above, in order to improve the quality of the guidance information radiated by an instrument landing system.

As a corollary to the foregoing object, it is an important aim of this invention to effect the necessary signal combining in the modulator apparatus at low audio frequencies (90 and 150 Hz) to thereby eliminate the need for hybrid combining networks or other circuitry to handle radio frequency energy.

Another important object of this invention is to provide a modulating method and apparatus as aforesaid wherein sum and difference signals are derived at the low audio frequencies and the carrier is directly modulated to provide the required carrier plus sidebands output signal, and the carrier is also directly modulated after special handling of the carrier and its modulating signal to provide the required double sideband, suppressed carrier output.

Still another important object of this invention is to provide a modulator as aforesaid wherein the double sideband, suppressed carrier output is obtained without employing mechanical sideband generators or combining networks at radio frequencies.

Furthermore, it is an important object of the present invention to provide a modulator arrangement as aforesaid wherein the modulation levels of both output signals are precisely controlled and high stability is insured.

Briefly, in the present invention the low frequency signals (90 and 150 Hz) constituting the guidance information are generated and then combined to provide sum and difference signals. Both the localizer and the glide slope system require that the carrier wave have sidebands containing the sum of the 90 Hz and 150 Hz signals as modulation, and require that the double sideband, suppressed carrier signal from the transmitter contain modulation which is the difference between the 90 Hz and 150 Hz signals. As will be discussed in detail hereinafter, the summation signal in the invention provides a composite modulating signal that is employed to directly modulate the radio frequency carrier. The carrier is also fed to a 180° phase shift network, and the carrier and the network output are alternately delivered to a modulated amplifier stage by an RF switch which is operated with each change in the sign of the difference signal. This phase-changing carrier (reversing in phase with each change in the polarity of the difference signal) is modulated with a modulating signal that is the absolute value of the difference signal, the resultant being the desired double sideband, suppressed carrier output. RF envelope detectors in negative feedback loops are employed with the modulated amplifier stages of both outputs, each in conjunction with a high gain operational amplifier that drives the modulating amplifier and receives the modulating signal and the detected envelope at its input.

DETAILED DESCRIPTION

Figure 1:
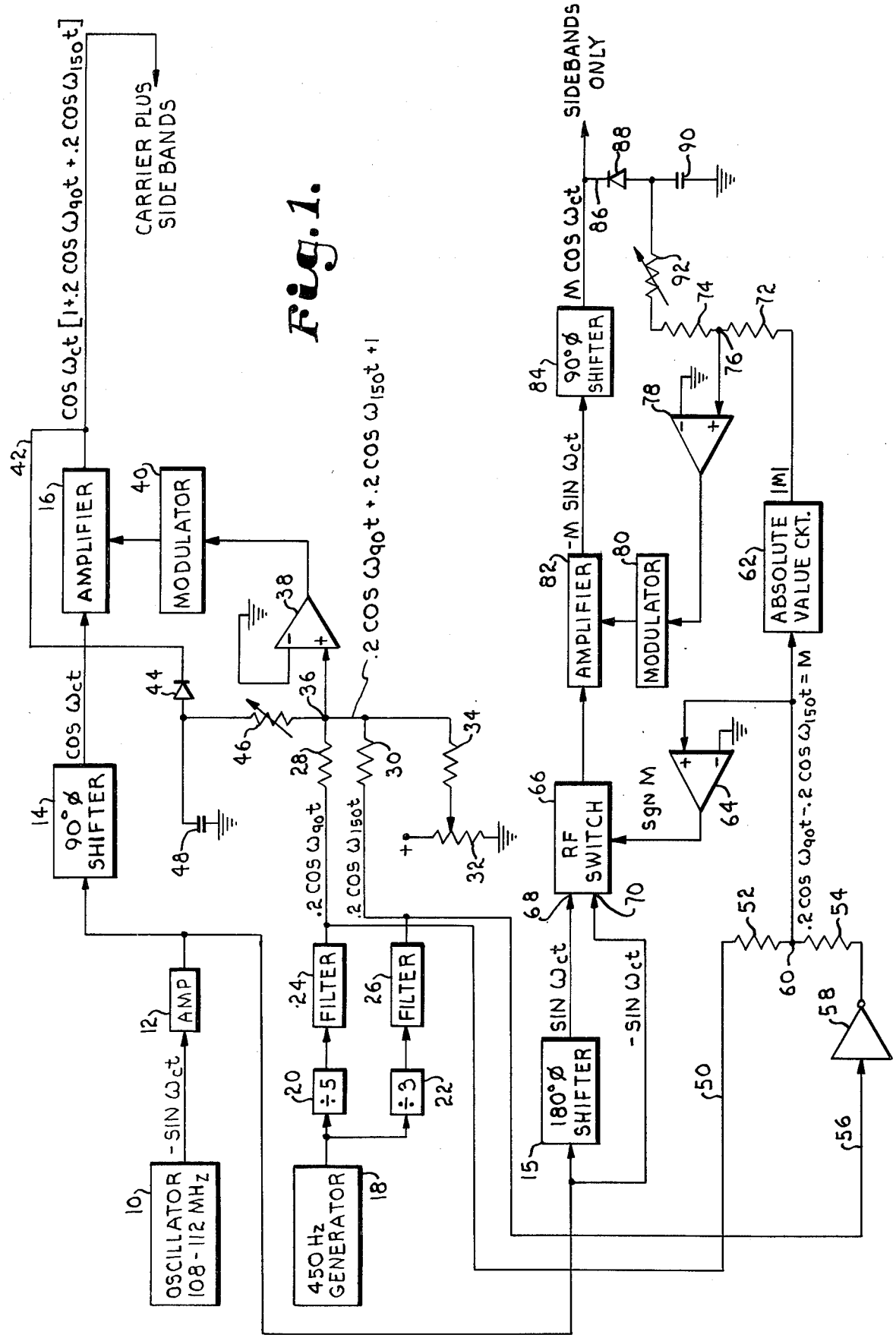
FIG. 1 is a schematic and block diagram of a localizer transmitter incorporating the improvements of the present invention.

Referring to FIG. 1, a carrier wave is generated by an oscillator 10 which would, in localizer applications, have a frequency in the range of from 108 to 112 MHz. The radio frequency carrier may be represented by the expression $-\sin \omega_c t$ as indicated by the legend, and is fed to an amplifier 12 whose output is connected to a 90° phase shift network 14 and a 180° phase shift network 15. The output of the 90° phase shift network 14 is $\cos \omega_c t$ and is fed a modulated amplifier stage 16. $\omega_c$ is the angular velocity of the carrier in radians per second, and t is time in seconds.

A 450 Hz square wave generator 18 delivers its output to a digital divide-by-5 network 20 and a digital divide-by-3 network 22. A 90 Hz square wave signal is, therefore, provided at the output of the divide-by-5 network 20, whereas a 150 Hz square wave signal is delivered at the output of the divide-by-3 network 22. These square waves are formed into sinusoidal signals by low pass filters 24 and 26 which suppress the harmonics and deliver the output signals $0.2 \cos \omega_{90} t$ and $0.2 \cos \omega_{150} t$ respectively, where $\omega_{90}$ is the angular velocity of the 90 Hz signal and $\omega_{150}$ is the angular velocity of the 150 Hz signal. These signals appear as voltage drops across resistors 28 and 30 respectively, which are precision resistors of equal ohmic value. A potentiometer 32 is connected between a positive direct current supply (indicated by the + terminal) and circuit ground represented by the ground symbol, and provides a direct voltage across a resistor 34 connected to its variable tap. The three resistors 28, 30 and 34 have a common connection at a junction point 36 to which the positive input (+) of an operational amplifier 38 is connected. The negative input (−) of amplifier 38 is connected to circuit ground. The operational amplifier 38 is operated as a high gain amplifier and drives a modulating amplifier 40 which is coupled with the modulated amplifier stage 16 in any conventional manner.

A feedback loop 42 is connected from the output of amplifier stage 16 to the junction point 36, and has an RF envelope detector therein represented by the diode 44 poled with its anode connected by a variable resistor 46 to the junction 36. An RF bypass capacitor 48 is connected from the anode of diode 44 to circuit ground. The common junction point 36 is a summing node as will be discussed more fully hereinafter.

The 90 Hz sinusoidal output from filter 24 is fed by a lead 50 to a resistor 52 which is in series with a second resistor 54. A lead 56 connects the output of the 150 Hz filter 26 to an inverter 58 whose output is connected to the lower end of resistor 54. Accordingly, the two sinusoidal 90 Hz and 150 Hz signals appear across resistors 52 and 54 respectively, such resistors being precision resistors of equal ohmic value. However, the 150 Hz signal being reversed in phase by the inverter 58, a difference signal is obtained at the common junction point 60 of resistors 52 and 54 and is fed to an absolute value circuit 62. The difference signal is also fed to one of the inputs (+) of a comparator 64, the other input (−) thereof being connected to circuit ground. The output of the comparator operates an RF switch 66 having switching inputs 68 and 70 receiving the phase-shifted carrier $\sin \omega_c t$ from phase shift network 15 and the original carrier $-\sin \omega_c t$ from the amplifier 12, respectively. The RF switch 66 may be any type of polarity responsive electronic switch and could, for example, employ two PIN diodes responsive to inputs 68 and 70 respectively and alternately rendered conductive by the changing sign of the output (sgn M) from comparator 64.

The absolute value circuit 62 may be any conventional circuit of this type which, in effect, delivers at its output a full wave rectified version of the applied input signal. For example, a pair of cascaded operational amplifiers may be employed where the first amplifier (receiving the input signal) operates as a follower and the second amplifier (delivering the circuit output) operates alternately as an inverter and a follower depending upon the polarity of the applied input signal. The output from the circuit 62 is represented by |M| and is fed to a resistor 72 which is in series with a second resistor 74. The junction point 76 of the two resistors 72 and 74 is connected to the positive (+) input of a high gain operational amplifier 78, and is a summing node. The negative (−) input of the operational amplifier is grounded, and the output thereof drives a modulating amplifier 80 which is coupled in a conventional manner with a modulated amplifier stage 82 that receives the phase-changing carrier from the RF switch 66. For proper phasing with the "carrier plus sidebands" output from amplifier stage 16, a 90° phase shift network 84 is inserted in the output of amplifier stage 82. A negative feedback loop 86 extends from the "sidebands only" output to the summing node 76, and includes an RF envelope detector represented by the diode 88, an RF bypass capacitor 90, the resistor 74, and a variable resistor 92 connected in series between the resistor 74 and the anode of the diode 88.

OPERATION

The carrier plus sidebands output signal may be represented by the general expression $$\cos \omega_c t \, [1 + A \cos \omega_1 t + B \cos \omega_2 t]$$

where $\omega_c$ is the angular velocity of the carrier as discussed above, $\omega_1$ and $\omega_2$ are the angular velocities of the two low frequency signals constituting the modulation information, and A and B are coefficients whose value depends on the desired modulation percentage. Similarly, the sidebands only output signal may be represented by the general expression $$\cos \omega_c t \, [A \cos \omega_1 t - B \cos \omega_2 t].$$

For the transmitter of a runway localizer, the coefficients A and B are each equal to 0.2 (20% modulation), and the standard modulation frequencies are 90 and 150 Hz for both localizer and glide slope transmitters. In glide slope equipment, the carrier is, of course, at a different radio frequency and a different modulation percentage is utilized, but the basic modulation principles are the same. Therefore, a glide slope transmitter made in accordance with the present invention would employ the same system components as illustrated in FIG. 1 for the localizer.

Figure 2:
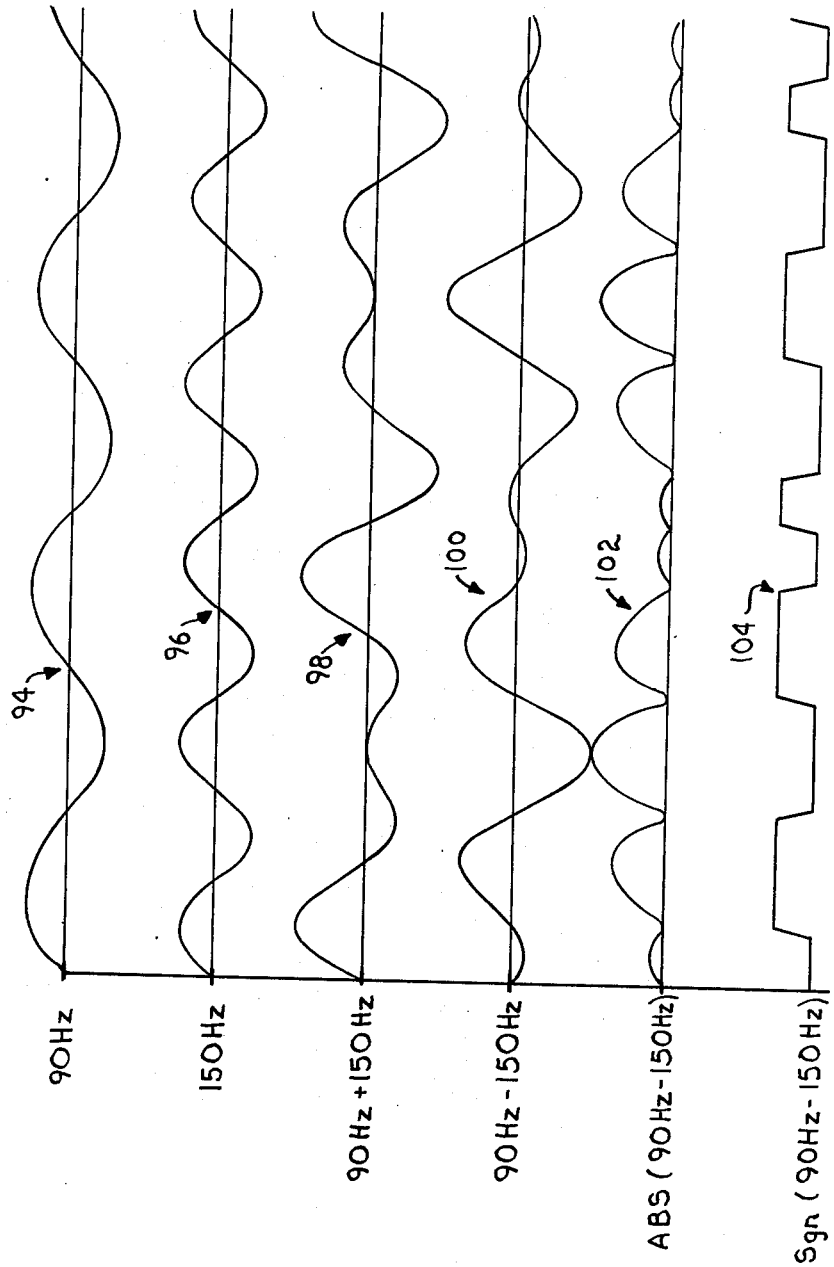
FIG. 2 illustrates wave forms at various points in the transmitter of FIG. 1.

Referring to FIG. 2, a 90 Hz wave form is illustrated at 94 and appears in FIG. 1 at the output of filter 24 and across the resistor 28. A 150 Hz wave form is illustrated at 96 and appears at the output of filter 26 and across the resistor 30. All of the wave forms of FIG. 2 are vertically aligned in time. The 90 Hz signal also appears across the resistor 52, and the 150 Hz signal, after inversion, appears across resistor 54.

Referring first to the generation of the carrier plus sidebands output, the 90 and 150 Hz signals are summed to provide a composite modulating signal at the summing node 36. This summation signal is represented by the wave form 98 in FIG. 2, and appears at the summing node 36 along with a DC level set by the potentiometer 32. This is the carrier level and accounts for the unity term in the expression $0.2 \cos \omega_{90} t + 0.2 \cos \omega_{150} t + 1$. Accordingly, variation of the carrier level will vary the modulation percentage assuming that the amplitudes of the 90 Hz and 150 Hz signals remain constant.

Since the envelope detector 44 in the negative feedback loop 42 detects the modulation actually appearing in the sidebands of the output signal from amplifier stage 16, the sum of the currents at the node 36 is theoretically zero when the current flowing into the node 36 via resistor 28, 30 and 34 and the current flowing from the node 36 through the diode 44 is equal to $0.2 \cos \omega_{90} t + 0.2 \cos \omega_{150} t + 1$. The negative input of the amplifier 38 being grounded, the output from amplifier 38 tends to equalize its two differential inputs (+ and −) by driving the modulator 40 accordingly. Therefore, low distortion in the carrier plus sidebands output signal is insured, and the relative carrier and modulation levels are maintained constant. The output level of amplifier stage 16 is controlled with the variable resistor 46.

Now regarding the generation of the sidebands only output, the difference signal appearing at junction point 60 is represented by the wave form 100 in FIG. 2 and by the expression $0.2 \cos \omega_{90}t - 0.2 \cos \omega_{150}t$. For convenience, this expression representing the difference signal will be defined as M. The comparator 64 senses whether wave form 100 is positive or negative and delivers an output equal to sgn M. The sgn M signal is illustrated in FIG. 2 by wave form 104 and is employed as a gate to operate the RF switch 66 to effectively reverse the phase of the carrier at the switch output with each change in the sign of the difference signal M.

The output from the absolute value circuit 62 is |M| and is represented by the wave form 102 in FIG. 2. This signal is applied to the resistor 72 and the detected envelope is applied to the resistor 74 in a manner analogous to the arrangement discussed above with respect to the generation of the carrier plus sidebands output. The absolute value signal |M| is employed as the modulating signal, and the high gain amplifier 78 responds to the current summation at node 76 to drive the modulator 80. Since the phase of the carrier reverses with each change in the sign of the difference signal M, the carrier is effectively suppressed and does not appear in the output $M \cos \omega_c t$. The variable resistor 92 serves as a level control for the sidebands.

More particularly, the phase-changing carrier from the output of the RF switch 66 is -sgn M sin $\omega_c t$ assuming that when sgn M is at the high level (see wave form 104) the condition of RF switch 66 is such that $-\sin \omega_c t$ is delivered at its output. Therefore, the modulated RF signal from amplifier stage 82 may be written $-|M|$ sgn M sin $\omega_c t$. Since |M| sgn M = M, the expression may be rewritten as $-M \sin \omega_c t$. After the 90° phase shift effected by network 84, the sidebands only output M cos $\omega_c t$ is produced. Accordingly, when the difference signal M goes negative, the sign of M may be reversed (as accomplished by the absolute value circuit 62) and the phase of the RF carrier may be shifted 180° without changing the result of the modulation process.

Figure 3:
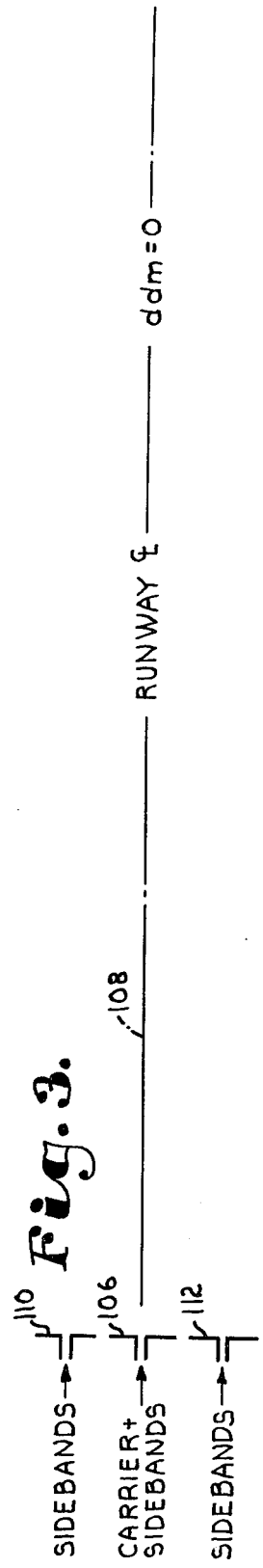
FIG. 3 is a diagrammatic illustration of a runway and a localizer antenna array.

Utilization of the two output signals produced by the transmitting apparatus of FIG. 1 is illustrated in FIG. 3. The carrier plus sidebands signal is applied to a center antenna 106 aligned with the runway center line 108. Through a feeder network (not illustrated), the sidebands only signal is applied to an antenna 110 on the right side of the runway center line 108 (as viewed by a pilot flying the guidance path). The sidebands only signal, after being shifted 180° in phase, is also applied to an antenna 112 on the left side of the runway center line. When the pilot is flying the guidance path, the difference in the depth of modulation (ddm) will be zero since the double sideband, suppressed carrier signals cancel one another and the modulation depths of the 90 and 150 Hz signals of the carrier modulation are equal. As is conventional, the 90 and 150 Hz components are separately detected in the airbone receiver.

However, if the pilot is to the right of the guidance path (a vertical plane through the runway center line 108), the feeder network for the localizer antenna array is arranged so that more 150 Hz modulation is detected than 90 Hz, resulting in a value of ddm indicating that the pilot is to the right of the guidance path. On the left side, the 90 Hz modulation is predominant and the ddm is likewise indicative of the position of the aircraft. It should be understood, however, that the three antennas 106, 110 and 112 are entirely diagrammatic in nature and are presented only for the purpose of illustrating the basic functioning of the localizer. In practice, a more complex array is commonly utilized in conjunction with a feeder network that receives the two outputs from the transmitter and distributes these outputs to the array in the proper phase relationship.

The same principles as discussed above also apply to ILS glide slope guidance. The modulated carrier wave is radiated from an antenna aligned with the glide path, and the double sideband signals cancel in space along the glide path to provide a ddm of zero. If the pilot is above the glide path, then the 90 Hz modulation predominates and, likewise, the 150 Hz modulation predominates if the aircraft is too low.

From the foregoing, it may be appreciated that the present invention provides the outpupt signal requirements for the instrument landing systems through completely electronic means without the use of motor driven sideband generators or other mechanical components. Furthermore, all combining of frequencies, including the deriving of summation and difference signals, is accomplished at audio frequencies to eliminate the possible instabilities inherent when signals are combined at radio frequencies.

Having thus described the invention, what is claimed as new and desired to be secured by Letters Patent is:

1. Transmitting apparatus for a radio navigation system which requires a first RF signal comprising a high frequency carrier amplitude modulated by the sum of a pair of signals of different, relatively low frequency, and a second RF signal comprising sidebands of said carrier derived from the difference between said pair of low frequency signals, said apparatus comprising:
   means for generating said pair of low frequency signals;
   means responsive to said pair of low frequency signals for summing the latter to provide a composite modulating signal;
   first output means responsive to said carrier and said composite modulating signal for amplitude modulating the carrier therewith to provide a carrier plus sidebands output signal presenting said first RF signal;
   means responsive to said pair of low frequency signals for subtracting one from the other to provide a difference signal;
   means responsive to said carrier and said difference signal for reversing the phase of the carrier with each change in the sign of said difference signal;
   means for deriving a modulating signal which is the absolute value of said difference signal; and
   second output means coupled with said phase reversal means and said deriving means for amplitude modulating the phase-changing carrier with said absolute value modulating signal to provide a double sideband, suppressed carrier output signal presenting said second RF signal,
   said phase reversal means including means for changing the phase of said carrier, 180°, switching means for delivering either said carrier or the 180° phase-changed carrier, and comparator means coupled with said switching means and responsive to polarity changes in said difference signal for operating said switching means to cause said carrier and said 180° phase-changed carrier to be alternately delivered to said second output means.

2. The apparatus as claimed in claim 1, wherein said first output means includes a modulated amplifier stage for delivering said carrier plus sidebands output signal, amplitude modulating means operably coupled with said stage and including a high gain amplifier having an input which presents a summing node and which receives said composite modulating signal from said summing means, and a negative feedback loop having an RF envelope detector therein, said loop extending from the output of said stage to said input of the high gain amplifier, whereby to stabilize the modulation level in said stage.

3. The apparatus as claimed in claim 1, wherein said means for changing the phase of said carrier comprises a phase shift network responsive to said carrier for shifting its phase 180°, said switching means having a pair of switching inputs receiving said carrier and the phase-shifted carrier from said network respectively.

4. The apparatus as claimed in claim 1, wherein said second output means includes a modulated amplifier stage for delivering said double sideband, suppressed carrier output signal, amplitude modulating means operably coupled with said stage and including a high gain amplifier having an input which presents a summing node and which receives said absolute value modulating signal, and a negative feedback loop having an RF envelope detector therein, said loop extending from the output of said stage to said input of the high gain amplifier, whereby to stabilize the modulation level in said stage.

5. The apparatus as claimed in claim 1, wherein each of said first and said second output means includes a modulated amplifier stage for delivering the respective output signal, amplitude modulating means operably coupled with said stage and including a high gain amplifier having an input which presents a summing node and which receives the respective modulating signal, and a negative feedback loop having an RF envelope detector therein, said loop extending from the output of said stage to said input of the high gain amplifier, whereby to stabilize the modulation level in the modulated amplifier stage of each of said first and said second output means.

6. The apparatus as claimed in claim 1, wherein said pair of low frequency signals are represented by the expressions $A \cos \omega_1 t$ and $B \cos \omega_2 t$ respectively, where $t$ is time and $\omega_1$ and $\omega_2$ are the angular velocities of the two signals, said composite modulating signal provided by said summing means being represented by the expression $A \cos \omega_1 t + B \cos \omega_2 t$, said first output means being operable to provide said carrier plus sidebands output signal represented by the expression $$\cos \omega_c t \, [1 + A \cos \omega_1 t + B \cos \omega_2 t]$$

where $\omega_c$ is the angular velocity of the carrier, and wherein said difference signal is represented by the expression $A \cos \omega_1 t - B \cos \omega_2 t$, said second output means being operable to provide said double sideband, suppressed carrier output signal represented by the expression $$\cos \omega_c t \, [A \cos \omega_1 t - B \cos \omega_2 t].$$

* * * * *